United States Patent [19]

Dunbar et al.

[11] Patent Number: 4,697,962
[45] Date of Patent: Oct. 6, 1987

[54] CONTROL SYSTEM FOR A CONTINUOUS PROCESS VENTURI ACCELERATED PNEUMATIC PUMP

[75] Inventors: Richard M. Dunbar, Oakdale, Minn.; Charles E. Wynosky, Minersville, Pa.; Henry E. Stoiber, Lakeland, Fla.

[73] Assignee: Coalair Systems Limited Partnership, New York, N.Y.

[21] Appl. No.: 761,970

[22] Filed: Aug. 2, 1985

[51] Int. Cl.$^4$ .............................................. B65G 57/66
[52] U.S. Cl. ....................................... 406/15; 406/22; 406/25; 406/32; 406/27; 406/120
[58] Field of Search .................................. 406/25-27, 406/144, 12, 120, 153, 24, 32, 15, 22; 222/144.5

[56] References Cited

U.S. PATENT DOCUMENTS

| | | | |
|---|---|---|---|
| 2,375,057 | 5/1945 | Wiegand | 406/27 X |
| 3,738,592 | 6/1973 | Smith et al. | 406/27 |
| 4,111,492 | 9/1978 | Mraz | 406/120 |
| 4,269,548 | 5/1981 | von Bennigsen-Mackiewiczel | 406/25 |

FOREIGN PATENT DOCUMENTS 579208 11/1977 U.S.S.R. .

Primary Examiner—Jeffrey V. Nase
Attorney, Agent, or Firm—Pearne, Gordon, McCoy & Granger

[57] ABSTRACT

An apparatus for feeding product to a pipeline via a venturi assembly has first and second tanks adapted to separately hold a quantity of product. The product is fed to the tanks from a supply hopper and enters each tank through an upper opening which accommodates a feed chute. The open end of each feed chute is closable by a flapper door which is swingable between open and closed positions. Pressurized air from a compressor is used to selectively close the flapper doors via a set of pressure valves which control the flow of air into the tanks. The product is fed from each tank to the pipeline through a Y-shaped housing and the venturi assembly. The housing has respective lower openings for each tank, also closable by swingable flapper doors. When the upper doors are closed by the air pressure, the product is forced out of the tank into the pipeline. A plurality of sensors are provided for sensing the product level in the tanks and a plurality of detectors are provided for indicating when the flapper doors are closed. A controller automatically monitors the sensors and detectors, and regulates feed of the product into the tanks and the pressure valves so as to maintain a continuous duty operation in which product is discharged from one tank as the other tank fills.

23 Claims, 6 Drawing Figures

CONTROL SYSTEM FOR A CONTINUOUS PROCESS VENTURI ACCELERATED PNEUMATIC PUMP

BACKGROUND OF THE INVENTION

1. Technical Field

The invention relates generally to pneumatic apparatus for conveying particulate material. More specifically, the invention relates to an apparatus for feeding material to a pipeline from a supply and a control system for maintaining continuous duty operation.

2. Discussion of the Related Art

A pneumatic conveying apparatus for transporting pulverulent, powdery, granular, liquid or like material and products is described in U.S. Pat. No. 4,111,492, issued to Mraz, and such disclosure is fully incorporated herein by reference. The apparatus generally includes a pair of tanks each having a product receiving conduit at the upper end thereof. Door-like valve members are provided to open and close respective upper and lower openings for feeding product into and out of the tanks. A Y-shaped housing provides a dual channel arrangement for separately feeding the product from each tank into the pipeline via a venturi assembly. The product is fed to the pipeline by alternately pressurizing the tanks, one tank filling while the other tank empties.

While the pneumatic conveying apparatus shown in the referenced letters patent is a substantial advance in the art, there are limitations because a technician operating the apparatus must closely watch and inspect the machine to verify safe and proper operation. In particular, it is important to ascertain that the tanks are properly emptying and filling, that the venturi assembly receives a continuous, steady, and controlled flow of material without disturbing or degrading the air flow in the venturi, and that there is not a blockage in the system, especially of one or more of the numerous valves. Also, the door-like valve members have been found to exhibit fatigue over extended operating periods, resulting in degraded seal integrity.

SUMMARY OF THE INVENTION

Accordingly, the present invention comtemplates a new and useful pneumatic conveying apparatus for feeding material through a venturi assembly to a pipeline which has means for automatically controlling continuous duty operation of the apparatus with minimal operator interface. One aspect of the invention is a programmable controller which monitors a plurality of sensing and detecting devices which provide inputs to the controller indicative of the operating status of the conveyor. The controller activates and deactivates a plurality of product feed mechanisms in response to the monitored inputs to sustain a substantially continuous flow of product through the venturi while maintaining proper overall operation of the conveyor.

According to another aspect of the invention, a controller is shown for a pneumatic conveying apparatus wherein the controller ensures that the only direction of release of the product is into the venturi assembly and the pipeline.

A further aspect of the invention is a flapper door valve for closing the product inlet and outlet openings of the tanks. The new valve is less susceptible to pivot fatigue and maintains its seal integrity over an extended period of time. The door valve is also designed to permit movement or removal of the door through the associated conduit which is closed by the valve.

These and other aspects of the invention will be more fully described and understood in the following specification in view of the accompanying drawings.

DESCRIPTION OF THE PREFERRED EMBODIMENT

Figure 1:
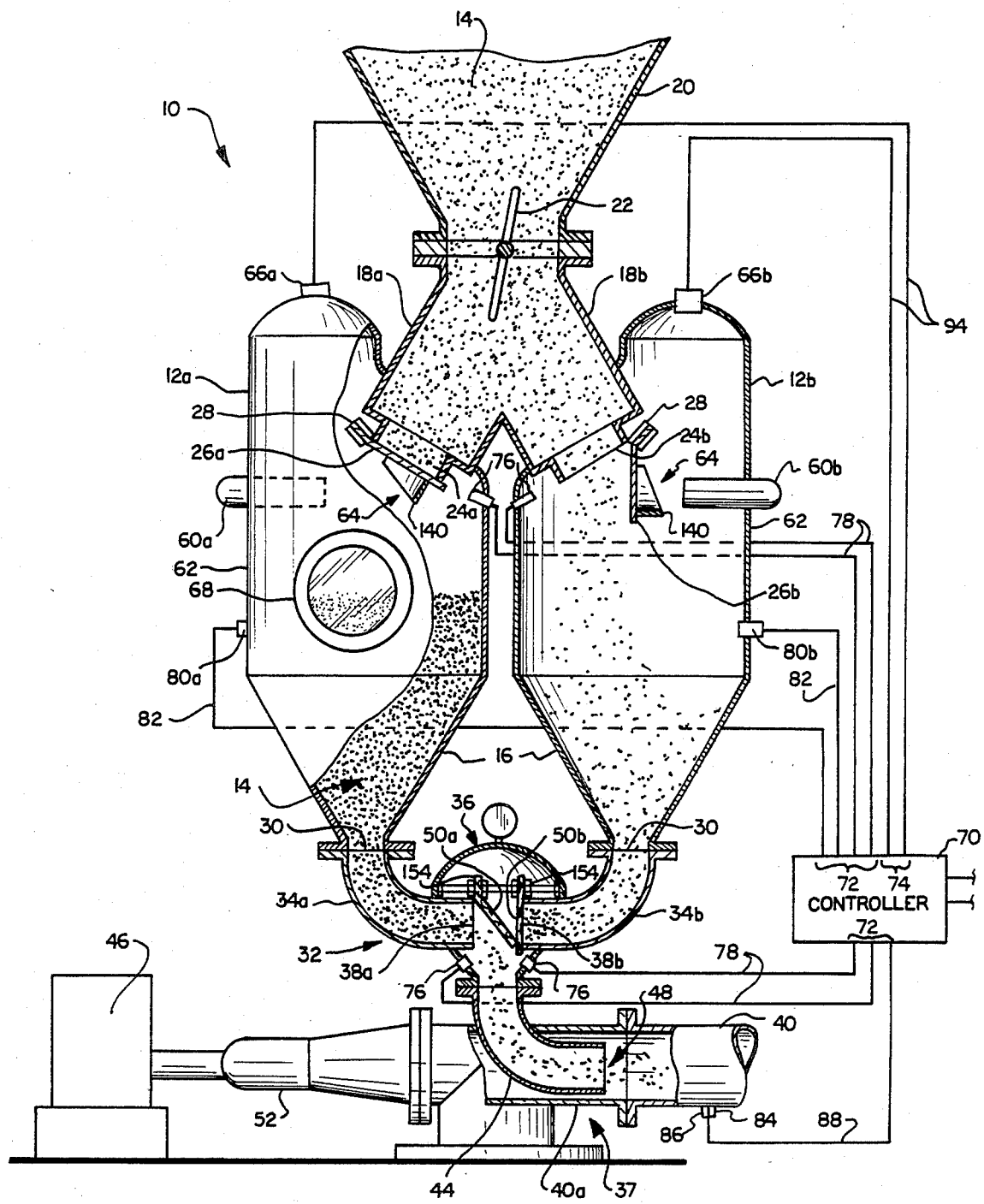
FIG. 1 is a front elevation in partial section of a pneumatic conveying apparatus according to the present invention.
Figure 2:
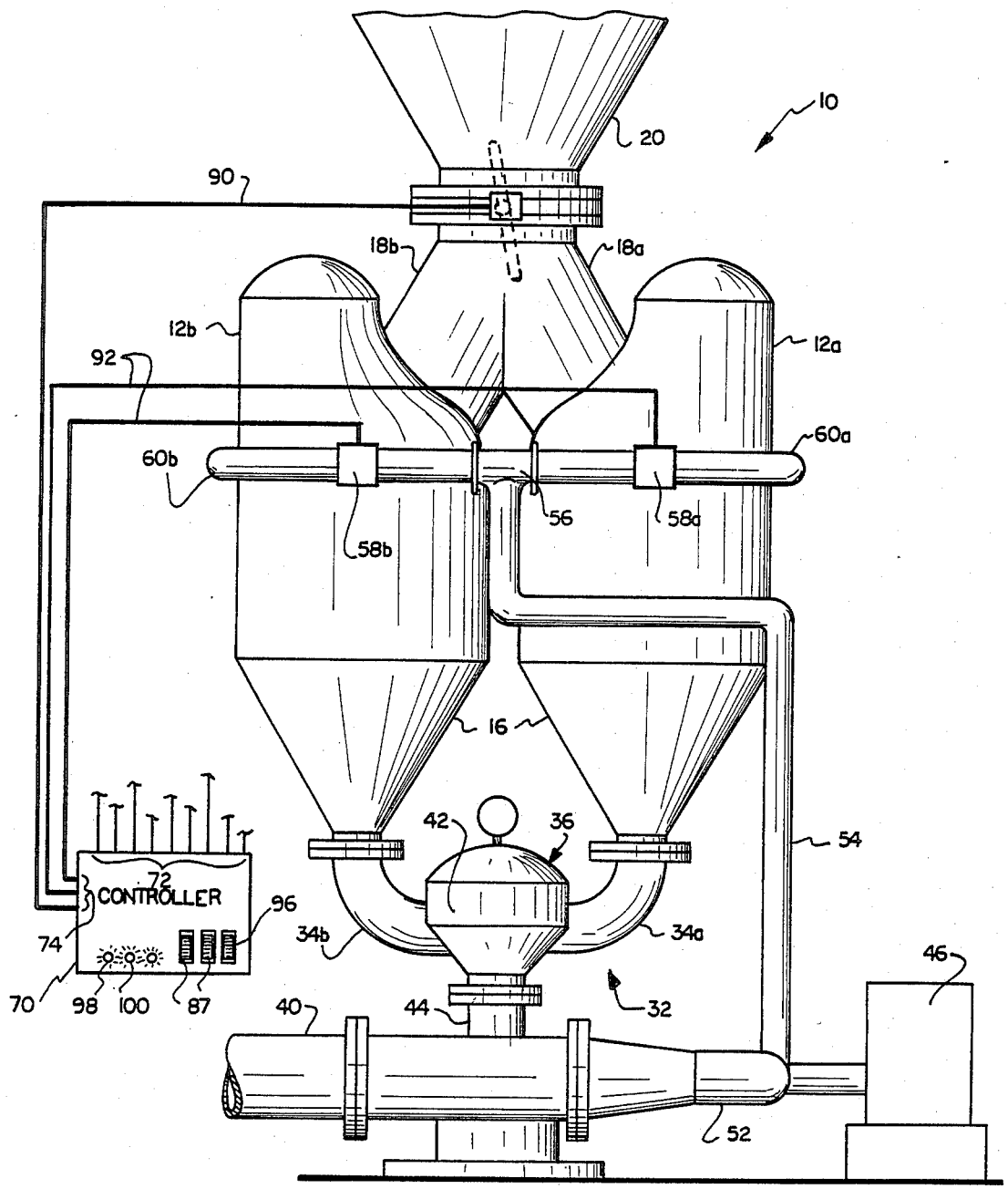
FIG. 2 is a rear elevation of the apparatus of FIG. 1.

A pneumatic extrusion and conveying apparatus for feeding particulate produce to a pipeline is generally indicated by the numeral 10 in FIGS. 1 and 2. Such apparatus 10 has two longitudinal, upright tanks 12a and 12b adapted to hold separate quantities of a product 14. Each tank is generally cylindrical in section, but includes an inverted and truncated conical section 16 at a lower end thereof.

At the upper end of each tank is a product receiving conduit 18a and 18b respectively, for entry of the product into the interior chamber of the tank. The product 14 is supplied from a supply hopper 20, as illustrated. A conventional electrically controlled butterfly valve 22 is provided to control the feed of product from the hopper 20 to the tanks 12a, 12b.

The inner ends of the product conduits 18a, 18b define upper openings 24a and 24b, respectively, for feeding the product 14 into the tanks. As illustrated, the conduits 18a, 18b extend into the tanks with their longitudinal axes extending downwardly at about 60-degree angle from horizontal. This conduit orientation promotes quick filling of the tanks 12a, 12b without material hang-up, because the angle of repose for many materials is less than 60 degrees. Of course, other entry angles for the conduits may be selected, depending on the particular flow characteristics of the product 14 being conveyed.

At the conduit inner ends are upper flapper door members 26a and 26b, respectively. These doors 26 are of similar construction and act as means for opening and closing the product feed openings 24a, 24b. As illustrated, one flapper door 24a is shown in the closed position and the other door 24b is shown in the normally open position. The construction and mounting of the doors 26 will be described in greater detail hereinbelow. For now, it will suffice to state that each flapper door 26a, 26b is mounted in a hinge-type arrangement 28 so that the doors open and close the conduits 18a, 18b by a simple pivotal movement about the hinge axis. The flapper doors hang generally vertically under their own weight in the normally open position, and each door is independently actuable to close its respective feed opening, so that during steady-state operation, one tank can be filled while the other or opposite tank is being emptied.

The lower conical section 16 of each tank provides an outlet 30 communicating with a Y-shaped housing 32 which is flanged at its two upper ends for attachment to mating flanges surrounding the outlets 30. The housing 32 has two product channels 34a and 34b, one for receiving product from each of the tanks 12a, 12b, respectively. The product channels 34a, 34b extend down from the conical sections 16 and then generally horizontally towards each other and open into a common closed chamber 36 which is part of the housing 32. The chamber 36 opens at the lower end thereof into a venturi assembly 37, the operation of which will be more fully described hereinafter. The venturi assembly 37 is shown somewhat schematically in FIG. 1. Complete disclosure as to the construction and operation of the venturi assembly is provided in U.S. Pat. No. 4,009,912, the entire disclosure of which is incorporated herein by reference. The channels 34a, 34b respectively define lower openings 38a and 38b for feeding the product 14 from the tanks to a pipeline 40 via the Y-shaped housing 32 and the venturi assembly 37. By using 90-degree elbows for the product channels 34a, 34b, the lower openings 38a, 38b are displaced laterally of the corresponding outlet 30 at the lower end of each tank 12a, 12b. This helps reduce the force tending to open lower flapper doors 50a, 50b due to the weight of the product.

The closed chamber 36 is provided by walls 42 and surrounds the lower feed openings 38a, 38b. The chamber 36, during operation, is at less than atmospheric pressure because it is in communication with a feed chute elbow 44 within the venturi assembly 37. The elbow 44 extends into a portion 40a of the pipeline 40 through which a carrier gas comprising a high velocity stream of air is forced by an air compressor 46. The high air velocity about the transition area 48 of the feed chute elbow 44 creates a reduced pressure in the chamber 36.

Each of the lower openings 38a, 38b is provided with a valve member in the nature of a lower flapper door 50a, 50b, respectively, which can be of similar construction to the upper flapper doors 26a, 26b. Preferably, the lower openings 38a, 38b lie in generally vertical planes such that the lower flapper doors 50a, 50b hang in a normally closed position as compared with the upper flapper doors 26a, 26b, which hang in a normally open position. Each lower flapper door is mounted in a hinge-type arrangement so that each door opens and closes its associated lower opening by a simple pivotal movement about the hinge axis.

As illustrated in FIG. 1, one lower flapper door 50a is shown in the open position and the other lower flapper door 50b is shown in the closed position. The facing ends of the channels 34a, 34b are spaced apart so that when one of the lower flapper doors (in the illustrated case, door 50a) is open, it interferes with and substantially prevents the other door from opening.

The air compressor 46 shown in FIGS. 1 and 2 may be a conventional turbine-type machine, and is used to supply compressed air or other suitable primary carrier gas through the pipeline 40 and to the tanks 12a, 12b. Compressed air is supplied to the pipeline 40 via a conduit 52.

Referring to FIG. 2, the compressor 46 also supplies compressed air through a conduit 54 to a tee coupling 56 and conventional electrically actuable solenoid valves 58a and 58b to pressurizing pipes 60a and 60b, which extend into the tanks 12a, 12b, respectively. As will be more fully described hereinbelow, the valves 58a, 58b are controlled so that only one of the pipes 60a, 60b is supplied with compressed air at any given time and only when the corresponding lower flapper door 50a, 50b is closed.

Referring again to FIG. 1, the pressurized pipes 60a, 60b enter their respective tanks transversely through a wall 62 thereof. The pipes 60a, 60b open into the interior of the tanks 12a, 12b generally facing an outer surface 64 of the associated upper flapper door 26a, 26b. Thus, when one of the valves 58a, 58b is open, high velocity air is directed at and acts on the corresponding upper flapper door 26a, 26b and the force of the compressed air stream sealingly closes the respective upper feed opening 24a, 24b by swinging the actuated door 26a, 26b up against the inner end of the corresponding product receiving conduit 18a, 18b (as illustrated in FIG. 1 with door 26a).

Air relief or vent valves 66a and 66b, shown in FIG. 1 only, are provided in the upper portions of the tanks for purposes which will be more fully apparent hereinafter. The air relief valves are conventional in design and are electrically actuable. A plurality of inspection windows 68 (only one shown in FIG. 1) are provided to permit visual observation of the operation of the apparatus 10, if desired.

The mechanical and functional steady-state operation of the apparatus 10 will now be described. Before the air compressor 46 is turned on, the lower flapper doors 50a, 50b are both in the normally closed position even when the tanks 12a, 12b are filled with product 14. The upper flapper doors 26a, 26b are normally open and, assuming, as is customary, a supply of product is in the hopper 20, both tanks 12a, 12b will be filled when the butterfly valve 22 is opened. The valves 58a, 58b (FIG. 2) are both initially closed, which permits the air compressor 46 to be started and to reach a stable operating point and assure proper pressure in the pipeline 40.

When one of the tanks 12a, 12b is filled, its corresponding vent valve 66a, 66b and solenoid valve 58a, 58b are opened. For illustrative purposes only, it will be assumed that tank 12a is first filled and initiates the discharge cycle operation; however, as will be apparent, either tank 12a or 12b may be the first to be filled and initiate operation.

As stated, with the tank 12a filled, the valve 58a is opened and supplies a blast of air against the adjacent face of the open upper flapper door 26a. The pressure of the air is effective to force the door 26a to swing and close off the upper product feed opening 24a of the conduit 18a. The pressure of the air on the upper surface of the product quickly increases to a level where the product 14 and a predeterminable amount of carrier gas discharges from the tank 12a into the Y-shaped housing 32.

The product 14 is biased by the air into the Y-shaped housing 32 via the 90-degree elbow product channel 34a. The static head, due to the weight of the product and the increasing air pressure, causes the lower flapper door 50a to swing open so that the product 14 flows into the chamber 36. The door 50a also maintains the other door 50b closed notwithstanding the subatmospheric pressure in the chamber 36 and the weight of the product 14 against the closed door 50b.

The product 14 and a predetermined amount of carrier gas at a specified pressure enter the venturi assembly 37 through a lower opening in the chamber 36. As the material and gas travel through the venturi core, the product is concentrated at the centerline of the pipeline as illustrated. As the product 14 and carrier gas exit the venturi core, they meet primary carrier gas traveling in the venturi 37 via a portion 40a of the pipeline. This predetermined amount of carrier gas at same pressure causes the product 14 and carrier gas to remain compressed in the centerline of the pipeline 40. Since the product 14 is already at some average "speed," the transfer into the pipeline 40 is smooth and efficient. The combination of the pressure pushing on the product 14 in the tank 12a, the subatmospheric pressure in the chamber 36 and elbow 44, and the high air velocity at the transition area 48 causes a rapid acceleration of the material as it flows from the housing 32 through the venturi 37 and into the pipeline 40. The distance down the pipeline that the product remains in the described condition depends upon the product material characteristics, the amount of carrier gas entrained in the product, the pressure and volume of the primary carrier gas, and the ratio of the cross-sectional area between the elbow 44 and the pipeline portion 40a. This ratio or setting depends upon all described conditions, but also creates the subatmospheric pressure in the elbow 44 and the chamber 36 which increase the efficiency of the "force" moving the product 14 from the tanks 12 to the pipeline. This effect is common to all inductors, but is unique when the product is conveyed in a push-pull condition as described and enters this low pressure region located in the centerline of the pipe. This condition may result in the Reynolds number normally associated with gas flows in a pipeline at the condition to be modified. At what point the traditional Reynolds number of gas/solids flow are effected depends upon terminal velocity of the product and the specific gas conditions at the time. The flow of air through the pipeline 40 can be adjusted with a valve (not shown) to enhance the feed of product into the pipeline.

While the tank 12a is being pressurized, the other tank 12b is at ambient pressure and product 14 continues to flow into the tank 12b to fill it. The associated vent valve 66b is open to exhaust air from the tank which is displaced as product fills the tank.

After a predetermined discharge time, the solenoid valve 58a is closed and the tank 12a is returned to ambient pressure by opening the vent valve 66a, thereby discharging a predetermined amount of carrier gas, and the discharge cycle is complete. The carrier gas can be cleansed of any product during venting of the tank by the use of a filter (not shown). When the tank 12a is vented to a sufficient degree, the flapper door 26a swings back to its original open position and the flapper door 50a is lacking the force of the bulk solids and carrier gas to remain open and returns to its original closed position. With the door 26a open, the product 14 feeds into the tank 12a through the opening 24a and refills the discharged tank.

When the air flow through the pressurized pipe 60a is turned off and the product starts to enter the tank 12a, the lower flapper door 50a closes sufficiently soon that the other lower door 50b can open.

When the first tank 12a is returned to ambient pressure, the opposite tank 12b is immediately pressurized and the process repeats in a similar manner. The tanks 12a, 12b alternately fill and empty in a complementary manner as long as product 14 is available from the support hopper 20.

The present invention contemplates the use of a programmable controller 70 in combination with the above-described apparatus 10 and various sensors and detectors which provide operational status indicators to the controller 70. The controller regulates and maintains the pneumatic apparatus 10 in a continuous duty mode of operation so as to enhance and maximize the advantageous operation and use of the venturi assembly 37. The controller 70 has a plurality of inputs 72 which receive the signals from the sensors and detectors and a plurality of outputs 74 which are connected to the various valves described hereinabove.

According to the invention, there is provided a proximity sensor or detector switch 76 associated with each of the upper flapper doors 26a, 26b and each of the lower flapper doors 50a, 50b. The switches 76 can be of conventional design of the type which detect the nearness of a metal object in a continuous magnetic field of a specific dimension. The switches 76 are arranged as illustrated such that they are actuated when the doors 26a, 26b, 50a, 50b are closed. A plurality of conductor wires 78 connect the outputs of the switches 76 to the appropriate inputs 72 of the controller 70.

There is also provided in each tank 12a, 12b a fill level sensor or probe 80a and 80b, respectively, each probe being generally positioned as illustrated in FIG. 1. The spatial location of each probe 80 is a nominal fill location and depends upon the type of bulk material being conveyed, the type of pipeline 40 and its size, the air pressure and volume to be used, and the distance the product is conveyed. The sensors 80 are of conventional design, which operate at a constant integrated frequency until a solid-like material touches the sensor. The operating frequency is then changed to a second frequency until the solid is removed. A set of conductor wires 82 connect the outputs of the sensor 80 to the appropriate inputs of the controller.

As illustrated in FIG. 1, high and low-pressure switches 84 and 86 are positioned in the pipeline 40 downstream of the housing 32. The pressure switches are conventional, and provide output signals to the controller 70 which indicate when the pipeline pressure exceeds or falls below predetermined levels for proper operation of the apparatus 10. A set of thumbwheel switches 87 provide a convenient means for the operator to dial into the controller 70 the appropriate pressure limits for operation of the apparatus 10. Conductor wires 88 connect the outputs of the pressure switches 84, 86 to appropriate inputs on the controller 70. The controller 70 continuously monitors the pressure switches, and when the pressure in the pipeline is not within the predetermined high and low limits, the controller shuts down the apparatus 10.

A pair of conductor wires 90 (FIG. 2) connect an appropriate drive output of the controller 70 to the butterfly valve and a set of conductor wires 92 connect the appropriate drive outputs of the controller 70 to the air solenoids 58a, 58b. Another set of conductors 94 (FIG. 1 only) connect the appropriate outputs of the controller 70 to the vent valves 66a, 66b. A master on/off switch 96 is provided with the controller 70 for operator control of the apparatus 10. The switch 96, of course, may also be located remote from the controller 70.

A suitable controller 70 for use with the invention is the Omron Model Sysmac S6, manufactured by Omron Electronics, Inc., Chicago, Ill. The high pressure switch 84 can be Transamerica Deleval Model EIH-H90, manufactured by Transamerica Deleval, Los Angeles, Calif., and the low pressure switch 86 can be Transamerica Deleval Model EIH-H-15, manufactured by Transamerica Deleval, Los Angeles, Calif. A suitable proximity switch 76 is Model 8035A105 FL3NAXX, manufactured by Automatic Timing and Controls Company, King of Prussia, Pa. The level probes 80 are preferably Model 602R IF, manufactured by Monitor Manufacturing Company, Elburn, Ill.

The purpose of the above-described instrumentation and controller is to provide continuous duty operation, meaning that the apparatus 10 will operate at a predetermined capacity for a given percent of availability for a predetermined duration. The controller 70 monitors the internal operation of the apparatus 10 to assure that each cycle is completed prior to initiating the next cycle. By maintaining a continuous duty operation, the controller 70 substantially enhances the accelerated extrusion of the product 14 into the pipeline 40, as described hereinbefore, via the venturi assembly 37. The controller maintains a continuous uniform flow of product into the vortex of the venturi without creating turbulence, and thus not degrading the uniform flow of the high velocity venturi air flow. The usefulness of the venturi assembly 37 is therefore enhanced since, otherwise, the venturi assembly is not a self-regulating mechanism. The functional operation of the controller 70 and related instrumentation will now be described, it being realized that such description is exemplary only for illustrating the concepts of the invention.

Figure 4:
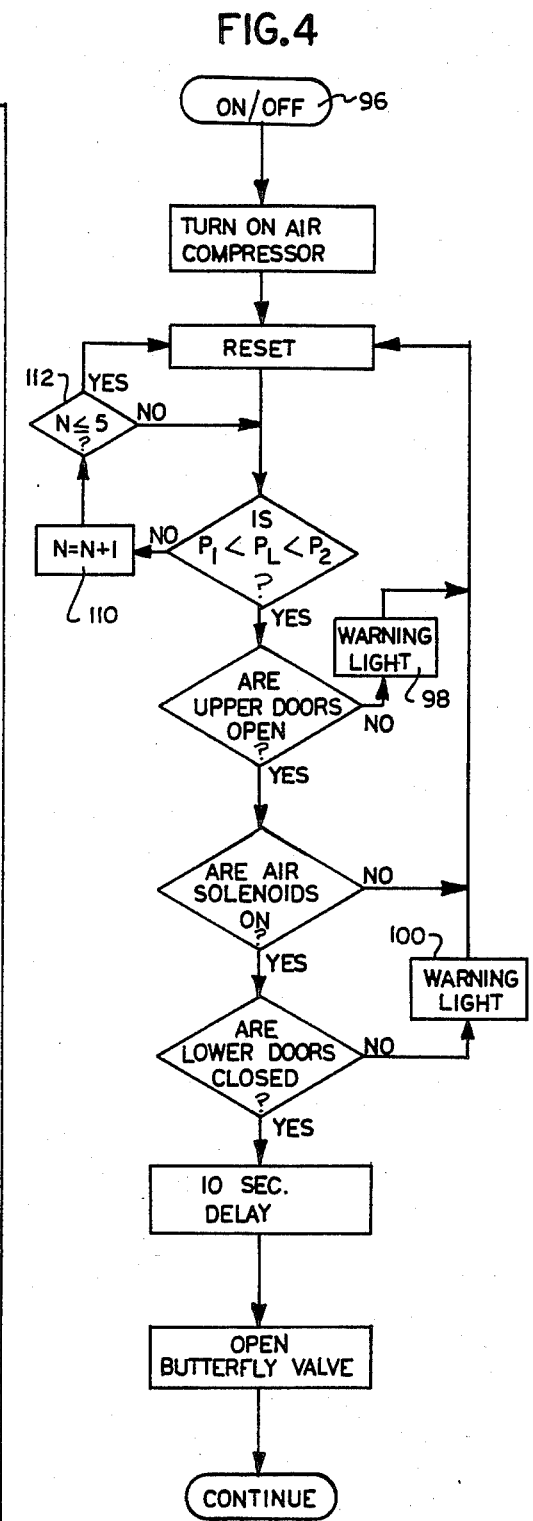
FIG. 4 is a flow chart diagram of a system start-up cycle for a controller used with the apparatus of FIG. 1.

Turning now to FIG. 4, a flow chart is shown for the initial start-up sequence for the apparatus 10, wherein it is assumed that the tanks 12a, 12b are empty but there is a supply of product 14 in the hopper 20.

The master on/off switch 96 initiates a reset step in the controller 70 and turns on the air compressor 46. The controller 70 verifies that the pipeline 40 pressure is within the high and low limits ($P_1$ and $P_2$, respectively) dialed in by the operator using the thumbwheel switches 87. The controller 70 reads the proximity switches 76 adjacent the upper flapper doors 26a, 26b and if either one is activated, which indicates the corresponding door is closed and not in its normally open position, the start-up sequence is terminated and an LED warning light 98 is lit on the controller 70 to indicate to the operator why the machine is not running. The controller 70 also checks that power is being applied to the solenoid valves 58a, 58b to hold the valves closed so that neither tank 12a, 12b is pressurized during start-up. The controller further checks that both lower flapper doors 50a, 50b are closed, as indicated by activation of the associated proximity switches 76. If the doors are not closed, another LED light 100 is illuminated and system start is aborted.

The controller 70 then waits ten seconds, following which it opens the butterfly valve 22 and the product 14 flows into the tanks 12a, 12b. This completes the start-up phase of operation.

Figure 3:
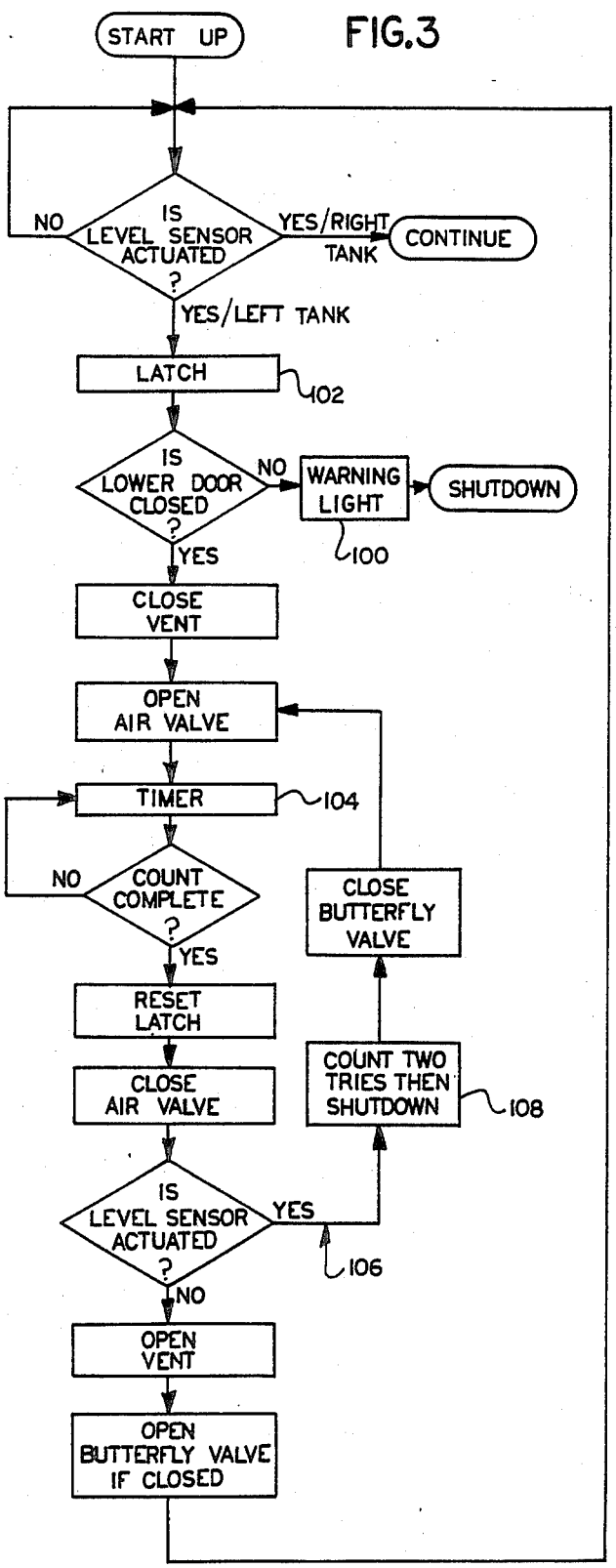
FIG. 3 is a flow chart diagram of a system steady-state operation for the controller used with the apparatus of FIG. 1.

Turning now to FIG. 3, there is shown a flow chart for steady-state operation of the apparatus 10. Herein, it is presumed that the start-up sequence has either just been completed or that at least one of the tanks 12a, 12b is filled from a previous run operation. For purposes of describing the steady-state operation, it will be presumed that the left tank 12a fills first or initiates operation, it being realized that either tank 12a, 12b can initiate operation. The flow chart shown in FIG. 3 only gives detail as to the left side or first tank operating sequence. The right side or second tank operating sequence is substantially identical in function, although, of course, duplicate circuits are provided as required.

After start-up, the controller 70 monitors the level probes 80a and 80b, respectively located in the tanks 12a, 12b as illustrated in FIG. 1. When one of the probes 80a, 80b indicates that a predetermined fill level of product 14 is in the associated tank, the pressurizing and discharge operation commences. The left level probe 80a (which is presumed to trip first) triggers a conventional resettable latch 102 in the controller 70. The latch 102 is used because as soon as the level probe 80a detects a filled condition, the controller immediately pressurizes the tank 12a, and product 14 begins flowing out of the tank into the housing 32. The level probe 80a can thus become uncovered too soon, which would prevent the discharge cycle from being completed. The latch 102 is used to essentially "fool" the control section into operating as if the probe 80a were still covered with product until the discharge cycle is completed.

When the level probe 80a indicates the fill level is reached, the controller 70 verifies that the corresponding lower flapper door 50a is closed by checking if the associated proximity sensor switch 76 is activated. If not activated, the controller 70 illuminates the LED warning light 100 and shuts down the apparatus 10. Normally, however, the lower door 50a is closed and the controller 70 closes the vent valve 66a and opens the solenoid-actuated pressurizing valve 58a. Up to this time (at which activation of the level probe 80a occurs), the vent valve 66a has been open to permit air displaced by the feeding product 14 to escape the tank 12a. Opening the valve 58a directs pressurized air from the compressor 46 to the pipe 60a. The pressurized air entering the tank 12a via the pipe 60a forces the upper flapper door 26a to swing into a closed position as illustrated in FIG. 1. With the door 26a closed, the tank 12a is pressurized to apply an increasing downward force on the product 14. The pressure builds up so as to discharge the product out through the lower flapper door 50a, which is forced open, and then on into the pipeline 40 via the venturi assembly 37, as previously described herein. The open lower door 50a interferes with and maintains the opposite door 50b closed during the pressurization of the tank 12a.

The air flow through the solenoid valve 58a continues for a predetermined period of time, which is determined by a timer 104 in the controller 70. The length of time that the tank 12a is pressurized depends, of course, on the specific application, but typically is between two and seven seconds.

While the product 14 in tank 12a is being discharged or fed out of the tank, the opposite tank 12b continues to fill with the product 14 even after its associated level probe 80b is covered. The discharge time of tank 12a is less than the amount of time it would take to overfill the opposite tank 12b to a degree which would interfere with the intended operation of the apparatus.

When the timer 104 times out, the latch 102 is reset and the controller 70 closes the valve 58a and checks if the level probe 80a is deactivated, indicating that product discharge is completed. If the level probe 80a indicates that product 14 is still in the tank 12a, it usually means that the upper flapper door 26a is stuck open, so a recycle mode 106 is initiated. When the tank 12a fails to empty during a discharge period (i.e., the level probe 80a is actuated), the butterfly valve 22 is closed by the controller and the air pressure valve 58a is reopened. This is done to try to develop enough pressure build-up against the butterfly valve 22 to take the place of the stuck-open flapper door valve 26a. A counter 108 is used to control the number of recycle attempts made prior to shutdown. Typically, two attempts will be made.

Usually, however, after the timer 104 times out, the level probe 80a indicates that the discharge cycle is complete, so that the recycle mode is not performed. The controller 70 then opens the exhaust or vent valve 66a. The controller also reopens the butterfly valve 22 if it was closed due to a recycle operation.

When the valve 66a is opened, the tank 12a returns to ambient pressure. The upper flapper door 26a is again in its normally open position and the lower door 50a is in its normally closed position, and the product 14 begins to feed into the discharged tank 12a and refill it.

As shown in FIG. 3, when the discharge cycle in the first tank 12a is completed, the controller checks that the opposite tank 12b is filled and then initiates a discharge cycle in tank 12b as tank 12a refills. The discharge cycle of the opposite tank is functionally the same as the first tank, and therefore is not illustrated in FIG. 3 and need not be described in detail. The tanks 12a, 12b alternate fill and discharge cycles in a continuous duty mode so long as there is product in the hopper 20, the lower flapper door 50 on the respective discharge tank is closed prior to pressurization, and the pipeline 40 pressure is within the preset limits.

It will be apparent from FIG. 3 that a tank which has completed a discharge cycle will begin to refill with product 14 even if the associated lower flapper 50 does not fully close (i.e., the proximity switch is not activated). This is done in the hope that the opening of the opposite door 50 during pressurization of the opposite tank will close the stuck door. After the opposite tank has discharged, if the lower door of the first tank is still open, the controller 70 then shuts down the apparatus 10. Thus, a discharge cycle cannot occur if the lower flapper door is open prior to pressurization, but one refill cycle per tank can occur with a lower door stuck open.

It should also be apparent from FIG. 3 that the vent valves 66a and 66b always operate in a complementary manner during steady-state operation, i.e., when one is open (during a fill cycle), the other is closed (during a discharge cycle). This interlock is programmed into the controller 70 to assure that as one of the tanks 12a, 12b is being pressurized, the other tank is not, so that the only direction of release of product 14 is through the housing 32 into the pipeline 40.

Although only shown in FIG. 4 for clarity, during the start-up cycle or the steady-state cycle of either tank 12a, 12b, if the pipeline 40 pressure falls outside the predetermined envelope monitored by the high and low pressure switches 84, 86, the controller 70 closes the butterfly valve 22 and shuts down the system. The controller is programmed to try to restart the system five times, using a counter 110 and comparator 112, in two-second intervals. Of course, the number of attempts and the duration of the attempts can be modified with simple software variations.

While the preferred embodiment has been described as operating with a predetermined discharge time controllable via the timer 104, it is also contemplated that the controller 70 can control operation based on the actual level of product 14 in the discharging tank.

Furthermore, the fill level probes 80a, 80b may be unsuitable for certain product materials such as cement. When the apparatus 10 is to be used with such materials, the controller 70 provides an internal timing function in place of the level probes (not shown) to meter the fill time of the tanks 12a, 12b and begins the discharge cycles after the timer has elapsed. In this situation, the timer essentially acts as a means for sensing a predetermined fill level of the product in the respective tank. The functional operation of the apparatus 10 and controller 70 is otherwise the same as described herein.

The invention also contemplates an improved flapper door and mounting arrangement therefor which will now be described. Such a door can be used for both the upper and lower door 26, 50, although the mounting arrangements can be different.

Figure 5:
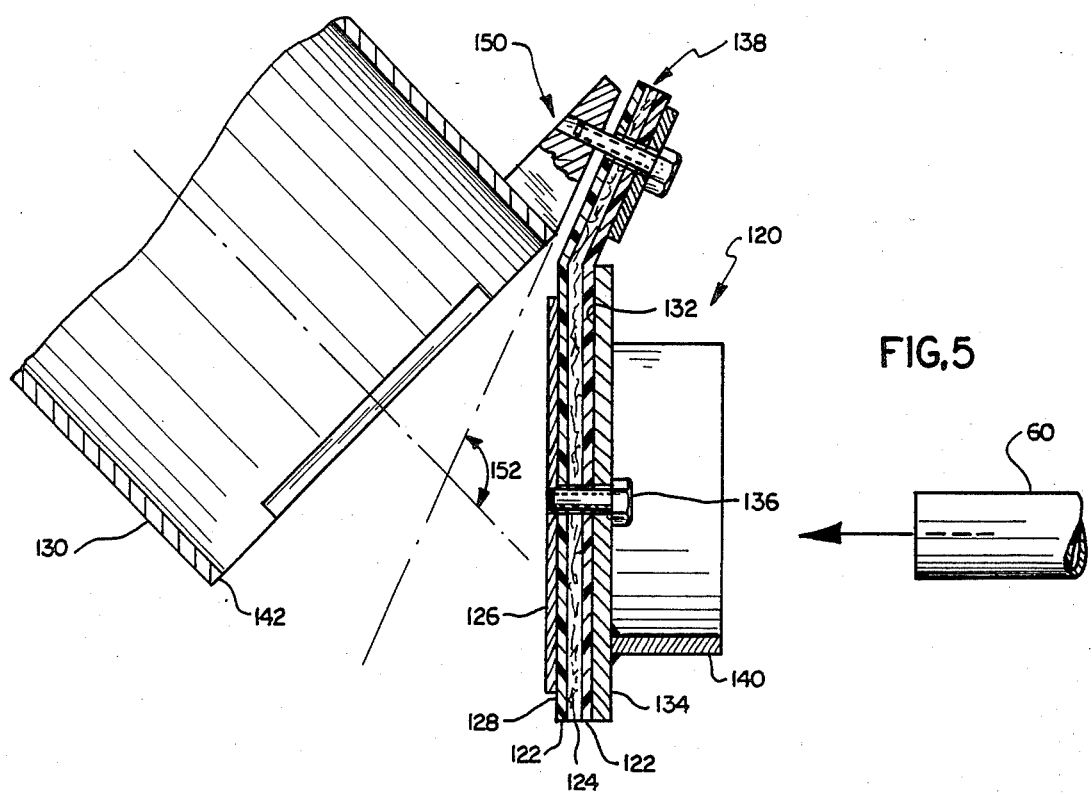
FIG. 5 is an elevation in section of a flapper door used with the apparatus in FIG. 1.
Figure 6:
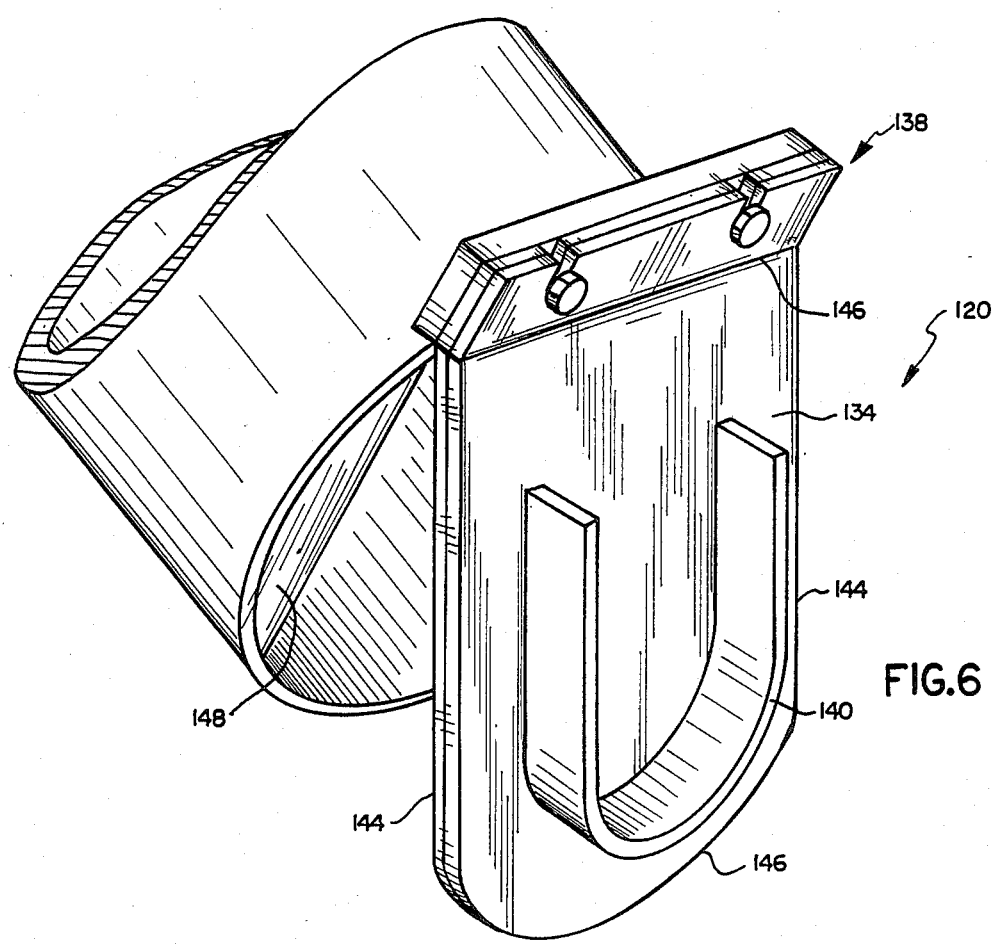
FIG. 6 is a perspective view of the door of FIG. 5 shown mounted on a conduit and in an open position.

Turning to FIGS. 5 and 6, a flapper door is generally indicated by the numeral 120. The door comprises two facing layers 122 of a resilient material such as rubber with a layer 124 of woven glass fiber 123 sandwiched between the layers 122. The glass fiber layer 124 is preferably bonded directly to the adjacent rubber surfaces, with a suitable bonding material known in the art.

A metal plate 126 is mounted with cement to the inner side 128 of the rubber layer which faces a conduit or chute 130 which the door 120 is used to sealingly close. The metal plate 126 is formed of sheet steel or other suitable material, and it is sized so as not to contact the perimeter of the chute 130 so that only the rubber layer 124 presses against the chute and forms a seal.

The outer side 132 of the opposite rubber layer 122 has mounted thereon a second metal plate 134. A through-bolt and nut assembly 136 holds the door assembly, and in particular the plates 126, 134, together.

As best shown in FIG. 5, the flapper door 120 includes a hinge-like extension member 138 adapted to be fixedly mounted to the conduit 130 or other suitable structure with a hanger 150. The member 138 is a lateral coextension of the rubber and glass fiber layers, and is shown spaced from the hanger 150 in FIG. 5. Thus, the door 120 is free to swing between an open position and a closed position with respect to the conduit 130. The door 120 is further provided with a horseshoe-shaped cup member 140 which is mounted as illustrated on the outer plate 134.

The durometer of the rubber layers 122 is preferably selected to minimize the force required to move the flapper door 120 while maintaining the hinge point integrity to prevent early fatigue.

The outer plate 134 carries the load of closing the flapper door 120 against the open end of the conduit 130 by providing a surface against which a force can be applied to swing the door 120 closed without damaging the rubber layers 122. The inner plate 126 provides a wear surface to protect the rubber layer which faces the conduit 130. When the force to swing the door 120 is applied via a high pressure air stream from a conduit 60 (as in FIG. 1), the horseshoe member 140 catches the air as the door 120 pivots so that the air continues to push on the door 120. The glass fiber layer 124 provides a substantial structural reinforcement to the door 120 and limits deformation of the rubber layers 122. Other fiber-woven materials may be used when appropriate.

Because the rubber layers 122 are cemented to the galss fiber 124 and the plates 126, 134, the rubber must accommodate elongation of the glass fiber layer which occurs as the door pivots about the hinge axis. The rubber must also have sufficient compression to prevent relative movement between the rubber layer 122 and the plates 126, 134.

The peripheral edge 142 of the conduit 130 is preferably formed with a rounded surface to improve the seal integrity when the door is pressed against the conduit. The radius of the edge 142 is selected to maximize seal pressure for a given operating or system pressure used to swing the flapper door 120 closed. Typically, the radius is one-half the conduit wall thickness.

As best shown in FIG. 6, although the conduit 130 is typically a round pipe, the door 120 has two opposed, longitudinal, straight sides 144 which join two opposed ends 146. The straight longitudinal sides 144 are spaced so as to provide a width to the door 120 which is less than the diameter of the conduit 130, thereby making it possible to remove the door through the conduit. This simplifies access to and removal for repair or replacement of the door. To assure a complete seal of the conduit 130, the open end thereof is provided with two opposed metal chord-like sections 148 (only one shown) which compensate for the reduced width of the door 120. Thus, the door 120 actually closes off the conduit 130 by sealing against a part of the circumferential periphery of the conduit and the edges of the chord sections 148. For clarity, the rubber and fiber layers are only shown schematically in FIG. 6.

Turning again to FIG. 1, a door such as just described is shown somewhat schematically, and is used as the upper flapper doors 26a, 26b for the apparatus 10. As illustrated, a hinge mounting means 28 (which can be similar to hanger 150 in FIG. 5) is provided on which the door is mounted. In the prior art (not shown), this hanger 28 was placed at 90 degrees with respect to the conduit 18 so that when the door was open a substantial stress was applied to the door and resulted in early fatigue, typified by separation or delamination of the rubber layer and glass fiber layer. According to the present invention, as illustrated in FIG. 1 and also in FIG. 5, the hanger angle 152 is increased by about 20 degress, from 90 degrees to 110 degrees, to reduce the stress on the flapper when it hangs in its normally open position.

The change in the hanger angle 152 results in part from the fact that the feed conduits 18a, 18b open into the tanks 12a, 12b at an angle other than vertical. Thus, the doors 26a, 26b are stressed in the normally open position. In the case of the lower flapper doors 50a, 50b, however, since each discharge elbow 44 opens in a vertical plane, the doors 50a, 50b hang normally closed in a vertical unstressed condition. Thus, a mounting hanger 154 for the lower doors can be fixed at 90 degrees with respect to the longitudinal axis of the elbow 44.

It will be appreciated that the important consideration is to reduce the stress on doors 26, 50 in their normal position, be it open or closed, since the doors are out of such position only during pressurization of the tanks 12a, 12b.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An apparatus for feeding product under steady-state conditions into a pipeline for pneumatic conveyance by carrier gas flowing through the pipeline at a predetermined pressure, comprising first and second upright tanks in combination with a venturi assembly adapted to introduce product into a pressurized pipeline for pneumatic conveyance, said tanks being arranged to separately hold a quantity of the product, each tank having an associated upper opening for receiving product through a supply means from a supply thereof and an associated lower opening for feeding product from the tank into said venturi assembly during a discharge period, means for selectively opening and closing said upper and lower openings, said upper openings being normally open and said lower openings being normally closed, means for selectively pressurizing each tank to a pressure above the pipeline pressure when said associated upper opening is closed to cause the product to flow from the tank into the venturi assembly through said associated lower opening, means for sensing a predetermined fill level of the product in each tank, means associated with each tank for detecting whether said upper and lower openings are closed, and control means for automatically regulating feed of the product into the venturi assembly in response to indications received from said sensing and detecting means to provide controlled continuous duty operation of said apparatus by verifying proper and alternate product flow into and out of said tanks wherein one tank is discharging product into the venturi assembly as the other tank is filling with product, said control means verifying prior discharge of product from said other tank to be filled by monitoring said sensing means, if discharge is not verified, said control means deactivating said supply means and activating said pressurizing means to temporarily pressurize said other tank to effect discharge thereof; if discharge is verified, said control means then activating said pressurizing means to pressurize said one tank to be discharged when said sensing means indicates said one tank is filled and said detecting means indicates said associated lower opening is closed.

2. An apparatus according to claim 1, wherein said control means include recycle means and the step of temporarily pressurizing said other tank is repeated for a predetermined number of times prior to shutdown of the apparatus.

3. An apparatus according to claim 1, wherein said control means includes a programmable controller which monitors said sensing and detecting means and actively controls said pressurizing means based on a predetermined set of conditions of said monitored means, including said fill level of product in each tank and closure of said upper and lower openings.

4. An apparatus according to claim 3 wherein activation of said pressurizing means closes said associated upper opening of said one tank and said associated lower opening opens at a predetermined pressure.

5. An apparatus according to claim 4, wherein said pressurizing means includes compressor means for providing pressurized air to said tanks and valve means for individually controlling pressure in each tank.

6. An apparatus according to claim 5, wherein air under pressure entering said tanks applies a force on said closing means to close said associated upper opening.

7. An apparatus according to claim 3, further comprising venting means in each tank for selectively venting said tanks to ambient pressure, said venting means being actuated by said control means and being closed during a discharge period.

8. An apparatus according to claim 7, wherein said control means opens said venting means after said discharge period in said one tank and thus prevents said one tank from pressurizing when said other tank is subsequently being pressurizied, said venting means in said one tank being operated alternately with said venting means in said other tank.

9. An apparatus according to claim 8, wherein said control means includes timer means for determining pressurizing time to discharge product from each tank.

10. An apparatus according to claim 9, wherein said control means deactivates said tank pressurizing means when said timer means times out.

11. An apparatus according to claim 10, wherein said control means shuts down the apparatus when said associated lower opening is not closed prior to pressurizing the corresponding tank.

12. An apparatus according to claim 3, wherein said control means verifies prior discharge in said other tank by monitoring said sensing means to determine the absence of product in said other tank.

13. An apparatus according to claim 12, wherein said supply means for feeding product to said tanks includes supply valve means for controlling flow of the product from said supply of product to said tanks, said supply valve means being actuated by said control means.

14. An apparatus according to claim 13, wherein said supply means include a common product feed inlet and said supply valve means is a butterfly valve arranged to control flow of product through said inlet.

15. An apparatus according to claim 14, wherein said sensing means is a level probe and said detecting means is a proximity switch which detects the position of a flapper door which opens and closes said upper and lower openings.

16. An apparatus according to claim 15, further comprising means for sensing the pipeline pressure, said control means monitoring said pressure sensing means and shutting down the apparatus when the pipeline pressure exceeds predetermined high or low limits.

17. A continuous duty apparatus for feeding product to a pipeline through a venturi assembly for pneumatic conveyance by primary carrier gas flowing through the pipeline at a predetermined pressure, comprising first and second upright tanks in combination with a venturi assembly adapted to introduce product into a pressurized pipeline for pneumatic conveyance, said tanks being arranged to separately hold a quantity of product, each tank having an associated upper opening for receiving product into the tank through a supply means from a product supply and having an associated lower opening for feeding product from the tank into said venturi assembly during a discharge period, said supply means including supply valve means for controlling flow of the product from the product supply to said tanks, means for selectively opening and closing said upper and lower openings, said upper openings being normally open and said lower openings being normally closed, means for individually pressurizing each tank to a pressure above the pipeline pressure when said associated upper opening is closed to cause the product to flow from the tank into the venturi assembly through said lower opening, means for sensing a predetermined fill level of product in each tank, means for detecting said upper and lower openings are closed, and control means for automatically regulating feed of the product to the venturi assembly and into the pipeline in response to said sensing and detecting means so as to maintain a steady and controlled flow of product through the venturi assembly and pipeline without degrading the air flow in the venturi by verifying proper and alternate product flow into and out of said tanks wherein one tank is discharging product into the venturi assembly as the other tank is filling with product, said control means verifying prior discharge of product from said other tank to be filled by monitoring said sensing means to determine the absence of product in said other tank, if discharge is not verified, said control means deactivating said suppy means and activating said pressurizing means to temporarily pressurize said other tank and discharge product therefrom in a recycle mode; if discharge is verified, said control means then activating said pressurizing means to pressurize said one tank to be discharged when said sensing means indicates said one tank is filled and said detecting means indicates said associated lower opening is closed.

18. An apparatus as set forth in claim 17, wherein for initial fill of said tanks said control means opens said supply valve means when said detecting means indicates said lower openings are closed and said upper openings are open and said control means inhibits said pressurizing means, said control means closing said supply valve means under any other conditions.

19. An apparatus as set forth in claim 17, wherein activation of said pressurizing means closes said associated upper opening and opens said associated lower opening at a predetermined pressure in said tank.

20. An apparatus as set forth in claim 19, wherein said control means includes timer means for controlling pressurization time of said one tank, said pressurization time being less than an overfill time of said other tank.

21. An apparatus as set forth in claim 20, wherein said control means includes latch means for providing a continuous indication that said one tank is full during said pressurizing time, said latch means being reset at the end of said pressurizing time.

22. An apparatus as set forth in claim 20, wherein after said timer means times out, said control means deactivates said one tank pressurizing means and activates the other tank pressurizing means when said other tank detecting means indicates said associated lower opening is closed and said sensing means indicates said other tank is filled.

23. An apparatus as set forth in claim 19, wherein said control means closes said supply valve means when said sensing means indicates said one tank did not properly discharge during said pressurization time.

* * * * *